June 14, 1966 D. V. SINNINGER 3,256,487

INTERFERENCE SUPPRESSION SYSTEM

Filed Aug. 8, 1962 3 Sheets-Sheet 1

INVENTOR.

BY Dwight V. Sinninger

Olson, Mecklenburger, von Holst, Pendleton & Neuman Attys

June 14, 1966 D. V. SINNINGER 3,256,487

INTERFERENCE SUPPRESSION SYSTEM

Filed Aug. 8, 1962 3 Sheets-Sheet 2

INVENTOR.
Dwight V. Sininger
BY
Olson, Mecklenburger, von Holst,
Pendleton & Neuman Attys

INTERFERENCE SUPPRESSION SYSTEM

Filed Aug. 8, 1962

3 Sheets-Sheet 3

INVENTOR.
Dwight V. Sinninger
BY
Olson, Mecklenburger, von Holst, Pendleton & Neuman Attys United States Patent Office 3,256,487
Patented June 14, 1966

3,256,487
INTERFERENCE SUPPRESSION SYSTEM

Dwight V. Sinninger, Oak Park, Ill., assignor to Senn Custom, Inc., Oak Park, Ill., a corporation of Illinois Filed Aug. 8, 1962, Ser. No. 215,723
5 Claims. (Cl. 325—369)

This invention relates to an improved interference suppression system and more particularly to apparatus especially adapted to reject interfering electromagnetic signals which are at about the same frequency as a desired signal.

There are two basic limitations on the optimum transmission of intelligence by electromagnetic waves. The first is a combination of radiation disturbances which generate interfering signals in space and the second is internally generated noise within receiving, interpreting or utilizing apparatus. The instant invention is adapted to improve the operation of such apparatus by reducing both forms of interference mentioned above. However, the instant invention is especially directed to the improvement of radio receiver reception and the like through reduction or elimination of radiated interference.

Radio interference may be of several forms and types. Impulse disturbances are generally quite easily eliminated. These constitute momentary variations in signal amplitude generally and they can therefore be eliminated or greatly reduced through short term amplitude control or amplitude selectivity. Typical of this type of selectivity is the amplitude limiting employed in frequency modulation reception. Competing relatively continuous interference signals may be reduced through amplitude selectivity and may also be reduced or eliminated through frequency selectivity where the interfering signal is not transmitted at a frequency identical to that of the desired signal. Receiver tuning satisfactorily eliminates most interference signals at even slightly different carrier frequencies.

A major source of interference which still remains in many received signals even after treatment as suggested in the foregoing description is interference transmitted at precisely the same frequency as the desired signal. This interference can only be eliminated either through a device which is sensitive to the informational content of the desired signal or is sensitive to the spatial relationship between the desired signal and the interference signal. The human ear and mind is the only system presently known which is sufficiently sensitive to informational content to be of any real value in this type of selectivity. The instant invention provides systems which are capable within broad limits of discriminating between two signals having a carrier of precisely the same frequency but emanating from geographically spaced points.

It has been found that while the instant invention operates most effectively and efficiently when the two signals are radiated from sources removed from the receiver apparatus and disposed at different angles of azimuth, the apparatus is also capable of discriminating between two sources of radiation aligned along a single radial but spaced apart. To a very limited extent this type of interference suppression has been attained through the use of loop antennas which possess known qualities of phase or directional selectivity. The loop antenna responds best to signal sources aligned with the plane of the loop while exhibiting minimum response to signal sources which are broadside with respect to the loop. Such space directivity in loop antennas has been used extensively for direction finding but has found little application in the field of interference suppression. The instant invention has many advantages over loop antennas or any other system heretofore employed for the suppression of interference signals having substantially the same frequency as a desired signal.

It is therefore one object of this invention to provide an improved system for radio interference suppression.

It is another object of this invention to provide an interference suppressor which is low in cost, requires little power for operation and requires little or no maintenance.

It is still another object of this invention to provide an improved interference suppression system which is small in size but efficient in operation both in eliminating or suppressing undesirable signals and in improving and amplifying the desired or selected signal and the signal to noise ratio thereof.

Another object of this invention is the provision of apparatus utilizing a simplified directive antenna system having greater effective height and signal collecting characteristics than conventional loop antennas.

It is another object to provide an improved interference suppression system which may be selectively used without substantial modificaton of the associated utilization equipment.

Other objects of this invention include the provision of interference suppression apparatus which maximizes signal to noise ratio of the system, has the ability to combat intentional jamming, reduces cross modulation in the early stages in associated receivers or other utilization apparatus, reduces superheterodyne radiation and includes means for signal attenuation where unusually strong input signals are encountered.

Further and additional objects of this invention will become manifest from a consideration of this description, the accompanying drawings and the appended claims.

In one form of this invention an elongate delay line is employed with a signal sensing means movable along the delay line and adapted to sense the signal in an incremental portion thereof by magnetic coupling. The line is similar to a four terminal transmission line with two terminals grounded and the two active terminals connected to independent signal collectors. The collectors may, for example, be two spaced antenna receiving a combination of intereference and desired signals. The antenna are connected to the delay line through identical attenuators preferably interconnected for equal and opposite movements. The sensing means is preferably connected to a tuned input cathode follower circuit which provides a high impedance input from the delay line with a low impedance output to a subsequent radio receiver.

The phase relationship of the desired signal as received at the first collector in comparison with that received at the second collector must be different than the phase relationship of the interference signal as received at the first collector in comparison with the same interference signal as received at the second collector. To attain this phase relationship the antennas or signal collectors should be spaced apart at least one-tenth wave length for the lowest frequency for which the equipment is designed. This is required to insure a sufficiently different phase relationship between the various signals for selectivity by the instant equipment. For complete phase versatility the effective length of the delay line should be sufficient to provide at least 180° of phase shift for the lowest frequency of the design spectrum. With such a configuration the sensing coil may be moved to a position along the delay line where the two interference signals from the respective collectors are precisely 180° out of phase and, with proper adjustment of the attenuators, of precisely equal amplitude. Thus the interfering signal is completely eliminated and the sensing coil responds only to the desired signal.

Reference will now be made to the accompanying drawings wherein.

Figure 1:
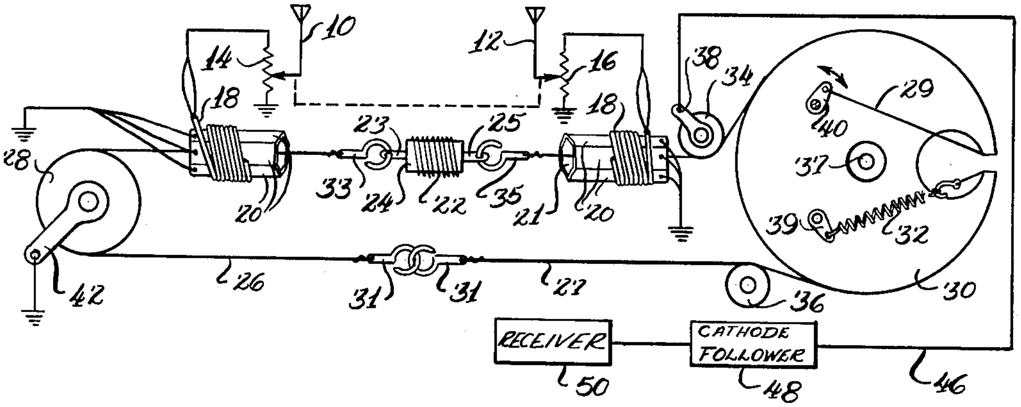
FIG. 1 illustrates one embodiment of this invention employing a delay line.

Referring now to the drawings, FIG. 1 shows in schematic form a pair of signal collecting means, namely, antennas 10 and 12, which are connected through identical adjustable resistive attenuators 14 and 16 to ground. For optimum operation it is preferred that the attenuators 14 and 16 be ganged so that they move together but in opposite directions, thus adjusting relative signal strength from the collectors 10 and 12 with the minimum movement of the potentiometer wipers. The two signal paths are thereby maintained as close to identical as possible providing simplified calibration and uniformity. The wipers are connected to the collectors 10 and 12 while one terminal of the potentiometers is grounded and the other is connected to the corresponding end terminals of a longitudinal delay line including helical winding 18 and a plurality of grounded elongate conductors 20.

The instant embodiment of the invention yields a satisfactory impedance match to the delay line where the signals from collectors 10 and 12 are of the same order of magnitude. Where the collector signals are widely different or variable, it is desired to use a more refined attenuator with better matching capabilities, such as an H, T or L resistive pad. Winding 18 is preferably formed of a single layer of bifilar insulated wire closely wound on a core 21. The core 21 is preferably nonconductive and nonmagnetic and has the longitudinal conductors 20 deposited thereon or secured thereto. In the disclosed embodiment four longitudinal conductors 20 are metallized on the core 21 and connected to ground at both ends. Other techniques known to the art may be used to produce the delay line characteristics in conjunction with coil 18.

A sensing coil 22 is wound upon a core 24 and movably suspended within the tubular core 21. Movable core 24 may also have longitudinal grounded conductors disposed thereon if desired for somewhat improved magnetic response. A pair of cleats 23 and 25 are secured to the ends of core 24 and provide means for supporting and driving the sensing coil 22.

The drive system for the coil 22 includes flexible conductors 26, 27 and 29. Conductors 26 and 27 are interconnected by hooks 31, conductor 26 is secured to cleat 23 by hook 33 and conductor 29 is secured to cleat 25 by hook 35. Rotatable pulley 28 supports conductor 26 and comprises a signal take-off connected to ground. Conductors 27 and 29 are connected to a non-conductive drive drum 30 which is rotatable with a shaft 37 which may also have a manually actuated knob connected thereto. Conductor 27 is secured to drum 30 by an adjustable arm 39 and a tensioning spring 32. Conductor 29 is secured to drum 30 by a similar adjustable arm 40. Two idler rolls 34 and 36 maintain proper alignment of the conductors and the coil 22 and also provide a signal take-off such as terminal 38. Pulley 28 has a similar terminal 42 connected to ground. All of the various components which are in the signal circuit, such as hooks 31, 33 and 35, pulley 28, idler 34 and the like may be silver plated for minimum noise and optimum circuit connections.

The sensing coil 22 is inductively coupled to only a short incremental portion of the delay line, and the position of the coil determines the delay of the signals from both end inputs, and consequently the phasic relationship thereof in the sensing coil. It is important that the terminations of the line match the characteristic impedance thereof with reasonable precision to avoid spurious reflections in the line. One particular embodiment of the invention has been found useful over the frequency range of 3.5 to 20 megacycles. A principal advantage of disposing the conductive segments 20 between the delay line winding 18 and the sensing winding 22 is the electrostatic isolation resulting therefrom as well as the efficiency of the construction. By providing the grounded core 20 between the two windings 18 and 22 any directional characteristics in the coupling are eliminated.

As is well understood in the art, a signal is propagated along the delay line such as shown in FIG. 1 at a rate dependent upon the electrical characteristics of the line. These characteristics include the incremental inductance of coil 18 and a capacitive reactance between the coil and the grounded elements 20. By determining these two constants of the delay line the propagation can be determined from the equation $$T=\sqrt{CL} \tag{1}$$

where C is the incremental capacitance, L the incremental inductance, and T the phase slope propagation time or delay. The characteristic impedance of the line may be calculated from the equation $$Z_0=\sqrt{\frac{L}{C}} \tag{2}$$

In designing such a delay line one must take into account the frequency for which the line is to be used and provide sufficient delay so that a total effective phase shift of at least 360° occurs along its length for the lowest frequency involved. As will be understood this total effective phase shift may be attained in the double ended version described with phase reversing switches if the delay line has an electrical length of only 90°. Thus if a signal is applied to the left-hand terminal of winding 18 from collector 10 it would be propagated along the line 18 to the right in FIG. 1 and would experience at least a 180° phase shift before that signal could be sensed at the right-hand terminal of winding 18. Conversely, the signal applied from collector 12 to the right-hand terminal will exhibit the same total phase shift as it is propagated to the left in the delay line having a different phase angle for each incremental position along the line. Depending upon the frequency of the signals and the effective length of the line there will be one or more points along the length of the line where a given signal, preferably an interference signal, will be propagating from opposite ends of the line in such a manner that the two signals will be in precise phase opposition at the sensing point. At the same time any other signal which is received at the two collectors 10 and 12 in a different phase relationship will not be in phase opposition at the selected point and will thus generate a signal in sensing coil 22. As mentioned, at one end of the delay line the pulley 28 engages conductor 26 and is connected through terminal 42 to ground. At the other end of the line idler 34 is connected through conductor 46 to a cathode follower circuit 48.

Such a device is usable over a wide range of frequencies covering, for example, a range of 100 kc. to 30 mc. In covering such a wide range of frequencies associated tuned circuits will require adjustment and band tuning for optimum operation. Cathode follower circuit 48 preferably has a tuned input providing a high impedance for power gain. The low impedance output from cathode follower 48 is applied to the receiver 50. As the result of the use of a tuned cathode follower in cooperation with the balance attenuators and phase shifting system an active phase discriminating interference suppressor is provided which may improve the signal to noise ratio, prevents superheterodyne radiation, improves signal strength, suppresses undesired interference signals and reduces early stage cross modulation.

Figure 2:
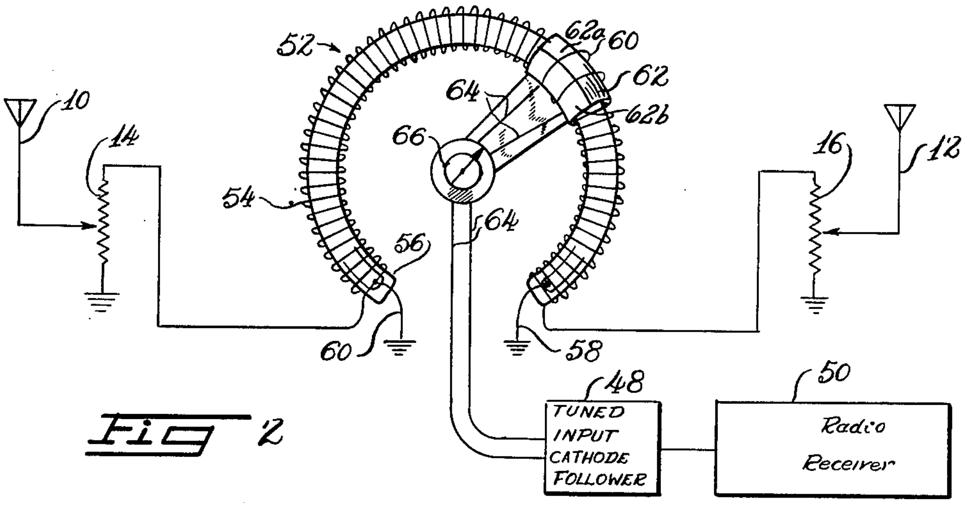
FIG. 2 illustrates an alternate embodiment of this invention employing a toroidal delay line.

A similar basic system having additional advantages is shown in FIG. 2. In FIG. 2 collectors 10 and 12 energize potentiometers 14 and 16 whereby signal strength is adjusted through manipulation of the potentiometers to insure identical amplitudes in the two phase-related signals. The ungrounded side of each potentiometer is connected to one end of a delay line 52 comprising a helical winding 54 which may be an enameled wire formed upon a conductive nonmagnetic core 56 formed of at least two and preferably at least four longitudinal segments to eliminate the ring effect. Each end of the core 56 is grounded through conductors 58 and 60 and the core cooperates with winding 54 to provide a transmission line having determinable incremental inductance and capacitance and known phase shift along the circumference of the toroidal line.

The principal advantage of the embodiment of FIG. 2 over that shown in FIG. 1 is that a sensing coil 60 may be mounted on a conductive nonmagnetic support 62 which is supported on a pivotally mounted radial arm 64. The support 62 must also be divided into electrically spaced longitudinal segments **62*a*, 62*b*, and must be grounded. The arm is driven by a central rotatable knob 66 attached thereto. Thus, with a minimum of space consumption a long line provides the required time delays. If preferred, the delay line 52 may be formed in the configuration of a helix with the sensing coil both rotatably and axially movable along the length of the helix. The net signal sensed by sensing winding 60 is a composite of the signals received at collectors 10 and 12 applied through conductors 64 to the tuned input cathode follower 48 providing power gain and system isolation. The output of cathode follower 48 is applied to any conventional radio receiver 50**.

Figure 3:
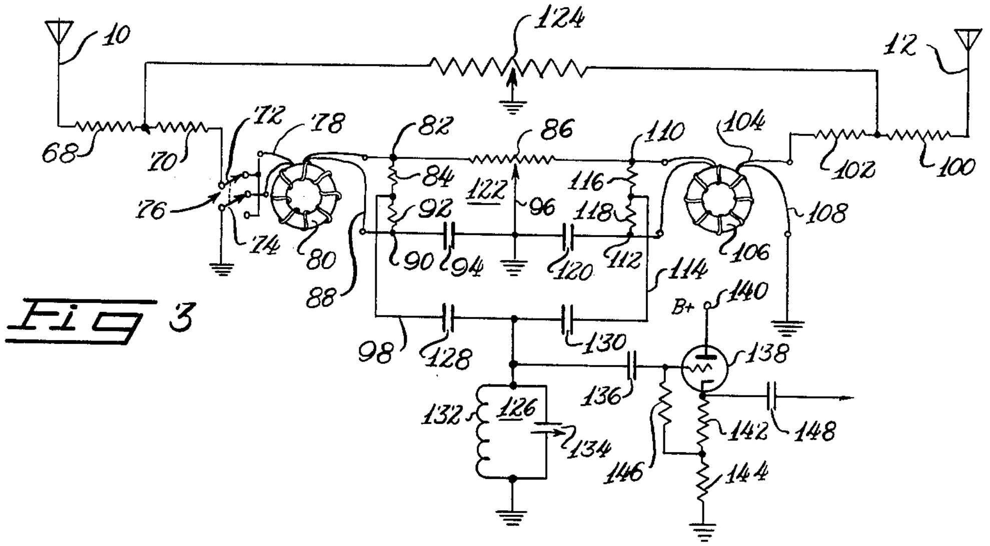
FIG. 3 illustrates another embodiment of this invention employing ferrite core circuit elements.

The embodiment of FIG. 3 employs a novel amplitude balancing technique and balun. Signal collector 10 is connected to a voltage divider including resistors 68 and 70 and one terminal of resistor 70 is connected to a movable pole of a double pole double throw switch 76. The other pole 74 is connected to ground. While switch 76 is illustrated with a common intermediate pole it is obvious that two poles may be electrically tied together in a more conventional switch. The double pole double throw switch 76 is a polarity reversing switch which substantially reduces the maximum phase shift required from the subsequent circuitry. As shown, movable pole 72 is connected to a continuous conductor 78 which is wound about a ferrite core 80 and terminates at junction 82 to which are also connected a potential dividing resistor 84 and a phase adjusting potentiometer 86. Pole 74 is connected to a conductor 88 which is twisted with conductor 78 and wound about ferrite core 80, terminating at junction 90 with divider resistor 92 and phase shift capacitor 94. It has been discovered that by winding the twisted pair of conductors 78 and 88 about ferrite core 80 a balun is created which simulates a long transmission line whereby an unbalanced input from collector 10 having one side grounded through switch pole 74 is transposed into a balanced output between junctions 82 and 90. Thus through this unique arrangement, it is possible to connect the wiper 96 of phase adjusting potentiometer 86 and phasing capacitor 94 directly to ground. This has manifest advantages in reducing stray capacitances and losses.

As is well known, an RC phasing network when connected as shown in FIG. 3 will produce between ground and the intermediate point between resistors 84 and 92 a voltage having a phase relationship to the input determined by the position of wiper 96. The output of this network is taken at the point between resistors 84 and 92 through conductor 98. If wiper 96 is moved substantially to the left in FIG. 3 whereby the resistance R in the RC network approaches zero, junction 82 is effectively grounded and the phase of the signal at terminal 90 is the phase of the signal in output conductor 98. Conversely, if wiper 96 is moved to the right, rendering the resistance R very large, junction 90 effectively approaches ground potential through capacitor 94 and the signal in output conductor 98 would be in phase with the input to the network as present at terminal 82. At all other intermediate positions of wiper 96 the signal in output conductor 98 will be of the same constant amplitude and related in phase to the ratio of resistance determined by wiper 96 to the capacitive reactance of capacitor 94. Wherever in this description "constant amplitude" or "constant phase" is mentioned, it should be understood that there may be some interrelationship between the various controls, especially if the components involved consume energy. This interrelationship may in some cases require a final fine adjustment of the controls.

Signal collector 12 is connected to an identical voltage divider including resistors 100 and 102 which are connected to one conductor 104 of a twisted pair. The other conductor 108 of the twisted pair is connected to ground. Twisted conductors 104 and 108 are wound uniformly together on a ferrite core 106. The free ends of the twisted pair are connected to right-hand junctions 110 and 112 which correspond to junctions 82 and 90 on the left-hand side of the phase adjusting network. An output conductor 114 is connected to the intermediate juncture of equal resistors 116 and 118 which are at their other ends connected to junctions 110 and 112, respectively. Capacitor 120 is connected between ground and junction 112 and the remaining terminal of potentiometer 86 is connected to junction 110. The output in conductor 114 will be of constant amplitude for all positions of wiper 96, will be representative of the signals actually received between junctions 110 and 112 and will bear a phase relationship to the signal in the conductor 98 which is determined by the position of wiper 96.

Phase shift of the signals in conductor 98 and in conductor 114 will be equal and opposite for movement of wiper 96. While in theory the phase shift in each of the output conductors could cover a total of 180° for variations in resistance R from zero to infinity whereby the network 122 would produce a total relative phase shift of 360°, the circuit is relatively unsatisfactory at the extremes in resistance values and thus it is preferred to limit the phase shift in each half of the network to the range of approximately ±45°. Thus the total change in relative phase available by manipulation of wiper 96 is ±90° in each of the identical networks or a total of 180° for the combination.

To provide complete phase adjustment and consequently the ability to cancel any selected interference signal, switch 76 including movable contacts 72 and 74 is provided. By shifting switch 76 to the alternate position the connections to the transmission line are reversed and this results in a 180° phase reversal. This 180° phase reversal plus the incremental change provided by potentiometer 86 provides complete phase versatility.

To provide effective suppression of interference signals the amplitudes of the two incoming signals must be substantially equal. This is attained in the embodiment of FIG. 3 by manipulating the grounded wiper of potentiometer 134 which is connected between the intermediate points of the voltage dividers including resistors 68 and 70 for collector 10 and resistors 100 and 102 for collector 12. Thus, the single potentiometer simultaneously and inversely adjusts the amplitude of the two signals while providing minimum stray effects through the grounded wiper.

The balanced outputs from the phase shifting network 122 are applied to a tuned tank circuit 126 through coupling capacitors 128 and 130. Tuned circuit 126 includes a grounded parallel network of inductance 132 and variable capacitor 134. Tank 126 should be broadly tuned to the frequency band of interest whereby a high impedance is exhibited to the input signal. The signal is applied through a coupling capacitor 136 to an amplifier including a triode 138 connected in a conventional cathode follower arrangement. The plate is connected to a source of positive D.C. voltage 140 and the cathode is grounded through resistors 142 and 144. In one embodiment of the invention the tubes are low noise triode amplifiers called nuvistors, and in that embodiment the D.C. voltage 140 cannot exceed 100 volts. The grid return resistor 146 is connected from the grid to an intermediate point between the cathode resistors 142 and 144. The output is taken at the cathode 138 and applied through coupling capacitor 148 to a conventional low impedance input of any desired utilization apparatus.

As a typical example of a transmission line useful in the embodiment of FIG. 3, it has been found that a small ⅜" ferrite core can be wound with fourteen inches of bifilar #36 enameled wire which is sufficient to provide a transmission line with a balanced output irrespective of the relationship of the input to ground.

Figure 4:
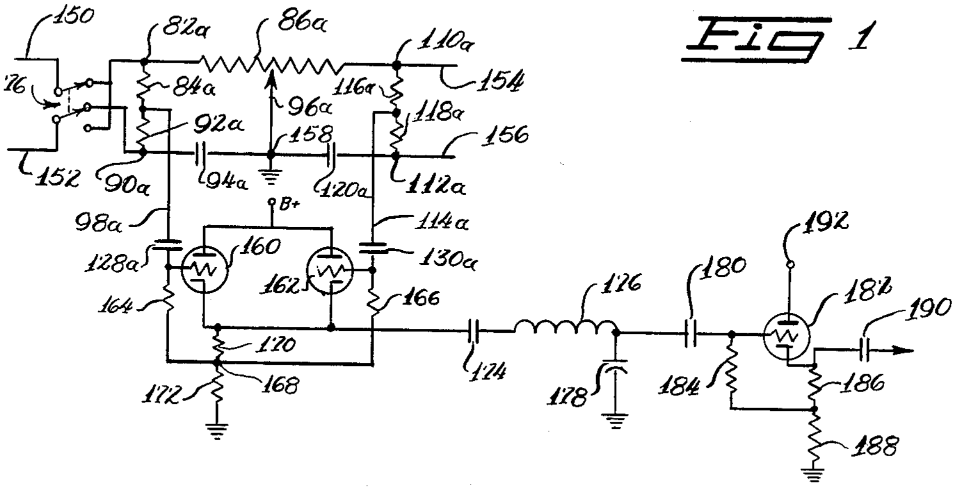
FIG. 4 illustrates another embodiment of the invention employing RC phasing network.

An alternate embodiment of the invention similar in many respects to that of FIG. 3 is illustrated in FIG. 4. For purposes of convenience the signal collectors 10 and 12, the potential dividers including resistors 68 and 70, 100 and 102, and the signal amplitude balancing potentiometer 124 are omitted from FIG. 4 but are in fact connected in a manner identical to that shown in FIG. 3 in the embodiment of FIG. 4. Thus, signals having equalized amplitudes and received from spaced collectors, such as collectors 10 and 12, are applied between the two pairs of incoming conductors 150 and 152 on the left-hand side and 154 and 156 on the right. Conductors 150–156 will be connected appropriately to balanced collectors, such as balanced antennas. Conductors 150 and 152 are connected to the switch 76 which is a 180° phase reversal switch as already described with respect to FIG. 3. The switch is connected to a pair of potential dividing resistors **84*a* and 92*a***.

The ferrite core transmission line which was employed in the embodiment of FIG. 3 for producing a balanced termination can be omitted in the instant embodiment because the incoming signals are already balanced to ground. Connected to the terminal **82*a* is one terminal of a phase adjusting potentiometer 86*a* having a wiper 96*a*. The other terminal of potentiometer 86*a* is connected to terminal 110*a* which is in turn connected to conductor 154. Connected between conductors 154 and 156 are potential dividing resistors 116*a* and 118*a*. At the bottom of the two potential dividers a phase shifting capacitor 94*a* is connected between terminal 90*a* and ground while a similar or identical phase shifting capacitor 120*a* is connected between the right-hand terminal 112*a* and ground. Also connected to the ground terminal 158 is the wiper 96*a* of potentiometer 86*a*. As already described above, by attaching the output conductors 98*a* and 114*a* to the nodal points of the voltage dividers, manipulation of potentiometer 86*a* produces a 180° phase shift in each network, provided the available resistance variation of potentiometer 86*a* is from zero to infinity. Within practical limits it has been found that using reasonable values of resistance in potentiometer 86*a* the phase shift available by rotation of wiper 96*a* is in the order of ±45° for each phase shifting network. As the two outputs 98*a* and 114*a* experience equal and opposite phase shifts this means that maximum relative phase shift available through manipulation of wiper 96*a* is ±90° or a total of 180°. To obtain full 360° flexibility in the phase adjuster the phase switching device 76 is provided. Thus by inverting the phase of the incoming signal from the left-hand collector 10 and providing 180° flexibility through wiper 96*a***, complete phase versatility is provided.

The output of the left-hand phase shifter is applied through output coupling condenser **128*a* to a cathode follower triode 160. In a similar manner the output of the right-hand phase shifting network is applied through coupling capacitor 130*a* to the grid of a triode 162 which is connected in a similar cathode follower circuit. These untuned triodes 160 and 162 function satisfactorily only where the particular triode has a highly linear response curve. However, other high impedance devices may be substituted therefor without difficulty. Grid bias resistors 164 and 166 provide the desired negative bias on the control grids of triodes 160 and 162. These are connected to a common point 168 in the common cathode resistance network of triodes 160 and 162 including resistors 170 and 172. The plates of triodes 160 and 162 are connected directly to a positive source of D.C. potential. By employing a common cathode resistance network including resistors 170 and 172, and a common source of grid bias, balanced operation is provided which produces added stability to the active phase shifting and noise suppression system without degeneration. As already described in detail, proper adjustment of the noise suppression system produces equal and opposite excursions of the voltage in the two-phase shifting networks for incoming noise and interference. Thus, when these equal and opposite signals are applied to the two grids of triodes 160 and 162, equal and opposite changes in conduction in these two triodes is produced whereby no net change in cathode bias or in output voltage is sensed. Conversely, intelligence signals representing the desired information are not 180° out of phase in the two-phase shifting networks, and thus these signals energize the two triodes 160 and 162 in some phase relationship other than 180° opposition. Therefore, the two signals are additive and are amplified and combined to produce a single net amplitude depending upon the particular phase relationship. This net amplitude of the desired signal is sensed at the common cathode connection of triodes 160 and 162 and applied through a coupling capacitor 174 to a tuned circuit including inductance 176 and capacitor 178. The voltage across the capacitor 178 is in turn applied through a coupling capacitor 180 to the grid of a second cathode follower 182. Cathode follower 182 is connected in a conventional manner with a grid bias resistor 184 connected to a mid-point of a cathode resistance network including resistors 186 and 188. The output of the cathode follower stage 182 is applied to any conventional utilization equipment, such as a radio receiver through coupling capacitor 190. The plate of tube 182 is connected at terminal 192** to any conventional positive D.C. supply.

Figure 5:
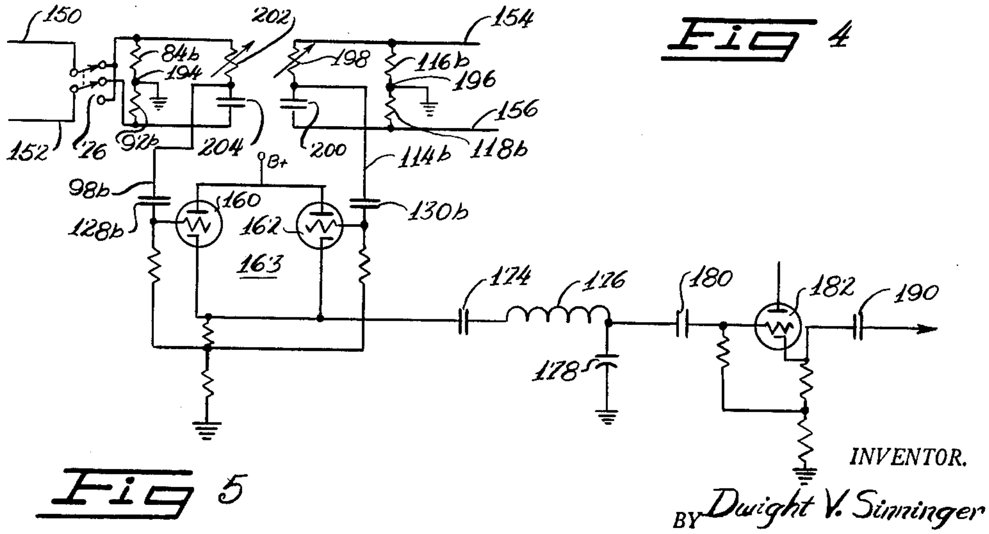
FIG. 5 illustrates another embodiment of the invention similar to that of FIG. 4.

Another similar embodiment of the invention is shown in FIG. 5. Again the collectors 10 and 12 and the amplitude adjusting means including resistors 68, 70, 100 and 102 and potentiometer are omitted but are preferably employed in the same manner as shown in FIG. 3. The left-hand collector 10 is connected to the phase reversing switch 76 through conductors 150 and 152. Similarly, signal collector 12 is connected to the opposite side of the phase controlling network through conductors 154 and 156. In this embodiment a pair of resistors **84*b* and 92*b* are connected across the switch 76 with a center common connection 194 connected directly to ground. A similar balanced technique is used with the right-hand collector wherein resistors 116*b* and 118*b* are connected between conductors 154 and 156 with an intermediate connection 196** connected directly to ground.

A phase-shifting network including a variable resistor 198 and a phase-shifting capacitor 200 is connected directly between the incoming conductors 154 and 156 with an output conductor 114b connected to the junction between the resistor 198 and capacitor 200. Thus, while the mid-point 196 is connected to ground, in other respects the embodiment of FIG. 5 is similar to that of FIG. 4. Similarly, in the left-hand network a variable resistor 202 is connected in series with a phasing capacitor 204 across the terminals of switch 76 whereby the signal received from collector 10 is applied to the phasing network in either one of two phase relationships. The two independently variable resistances 198 and 200 replace the single-phase adjusting potentiometer 86a of FIG. 4. Therefore, the points 194 and 196 may be connected directly to ground providing a different relationship to ground for the entire system. The embodiment of FIG. 4 has certain distinct advantages over the embodiment of FIG. 5 which employs two independently variable resistors and the grounded points 194 and 196. In the embodiment of FIG. 4 one side of the phasing capacitors 94a and 120a is grounded providing added stability in the circuit and minimizing stray capacitances. Also the wiper 96a of potentiometer 86a is connected directly to ground, thus further reducing stray effects.

The two resistors 198 and 202 in the embodiment of FIG. 5 may be mechanically ganged together although electrically isolated, thus providing for adjustment of the phase relationship in each of the networks of the system by the manipulation of a single knob. As will be apparent, to conform to the mode of operation described above, resistor 198 should increase in value for decreasing values of resistor 202 and vice versa. The resistance value of resistors 198 and 202 is selected to provide a total phase shift in each of these networks of approximately ±45°. Thus the total relative phase shift is ±90° or a total of 180°, and with the 180° phase shift available through switch 76 complete phase versatility is provided.

The remainder of the circuit is identical to that of FIG. 4. The outputs from conductors 98b and 114b are applied through coupling capacitors 128b and 130b to vacuum tubes 160 and 162 connected in a common cathode resistor cathode follower circuit 163. The output is coupled through capacitor 174 to a tuned network including inductance 176 and capacitor 178. This tuned circuit provides substantial voltage peaking. The output is taken across capacitor 178 and applied through coupling capacitor 180 to a second cathode follower including triode 182. The output of triode 182 is taken at the cathode and applied through coupling capictor 190 to subsequent utilization apparatus.

Figure 6:
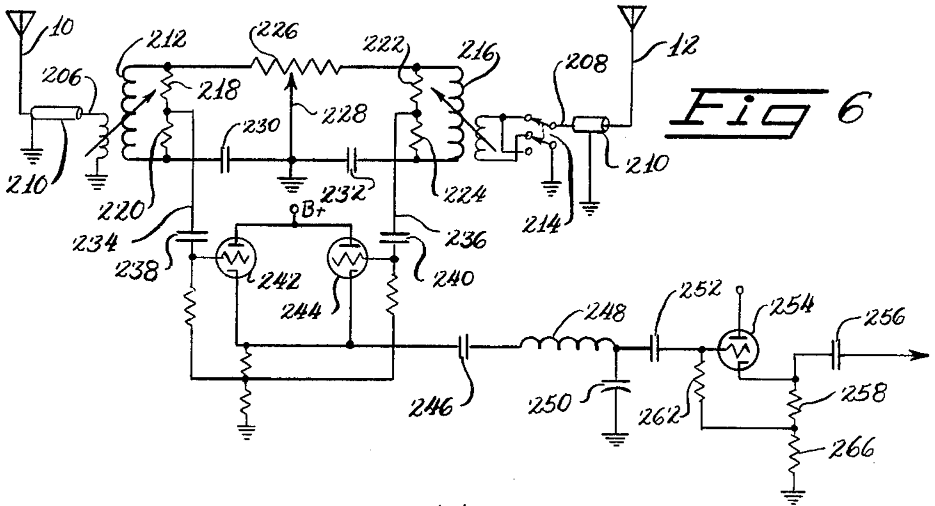
FIG. 6 illustrates still another embodiment of the invention employing amplitude-adjusting variometer coupling to the antennas.

The embodiment of FIG. 6 is quite similar to that of FIGS. 4 and 5. Signal collectors 10 and 12 are coupled through conductors 206 and 108 to a phasing network. The conductors 206 and 208 are provided with electrostatic shields 210 which are connected to ground. Such shielding may be employed throughout the various embodiments where desired to avoid spurious signals. Conductor 206 is connected to a variable transformer 212, and conductor 208 is connected through a phase reversal switch 214 to a similar variable transformer 216. It is preferred that transformers 212 and 216 be mechanically coupled together in such a manner that manipulation of the control therefor produces increasing magnitude in one of the devices for corresponding decreasing magnitude in the other. Connected across the output terminals of transformer 212 is a voltage dividing resistance network including resistors 218 and 220. Similarly connected across the output secondary winding of transformer 216 is a network including resistors 222 and 224. Connected between the upper terminals of the two transformers is a phase controlling potentiometer 226 having a grounded wiper 228.

A phase controlling capacitor 230 is connected between the bottom terminal of the secondary winding of transformer 212 and ground and a similar phase capacitor 232 is connected between the lower terminal of the secondary winding of transformer 216 and ground. As already described, movement of wiper 228 controls the phase in both output conductors 234 and 236 which are in turn coupled through capacitors 238 and 240 to the control grids of a pair of triodes 242 and 244. These triodes are connected in a common cathode resistor cathode follower circuit as already described. The plates are connected to a source of positive D.C. potential and the output is taken at the cathodes of triodes 242 and 244 and applied through coupling capacitor 246 to a tuned network including inductor 248 and capacitor 250. The tuned network provides a voltage gain whereby the total power gain of the system is greater than unity. The output of the tuned network is applied through coupling capacitor 252 to a second cathode follower including triode 254. The output of tride 254 is taken at the cathode and applied through coupling capacitor 256 to any desired utilization apparatus. Triode 254 has a cathode resistive network including resistors 258 and 260 with a grid bias resistor 262 as already described. The plate of triode 254 is connected directly to a source of positive D.C. voltage.

Figures 7, 8:
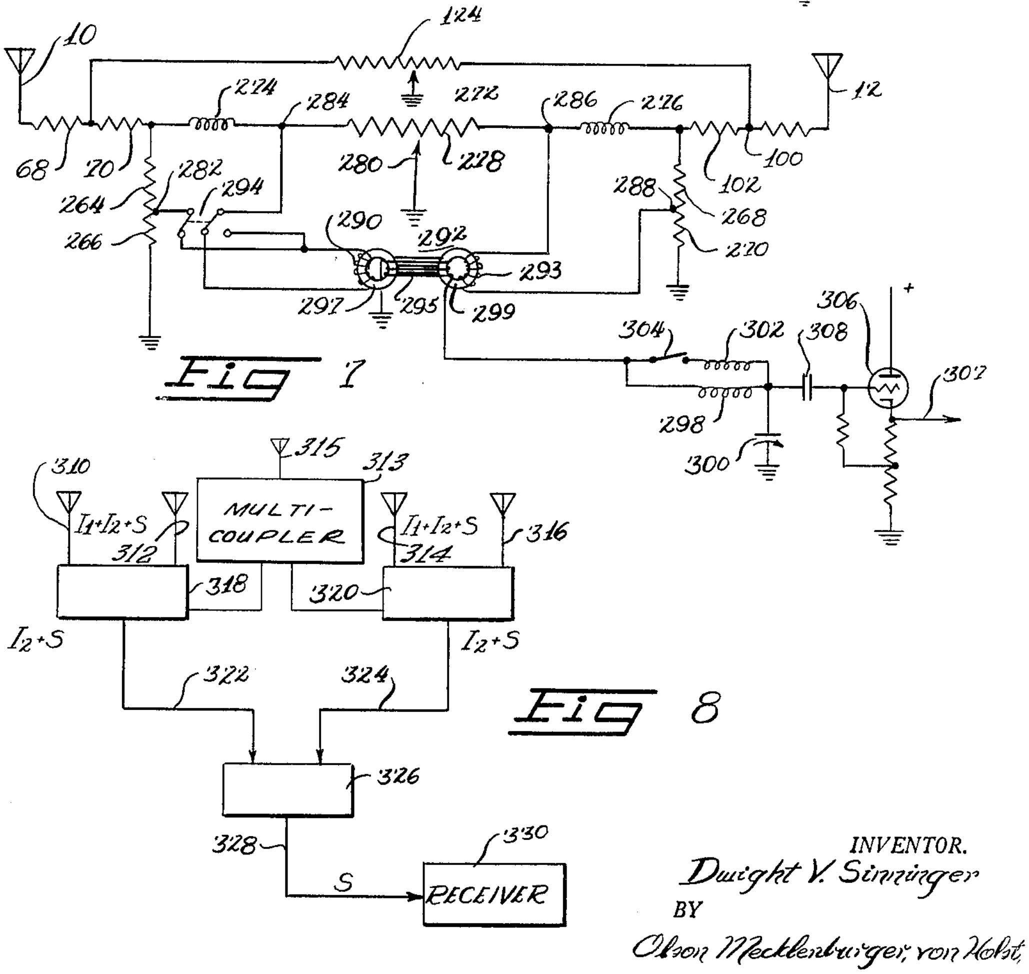
FIG. 7 illustrates a further embodiment of the invention showing unbalanced antenna inputs.
FIG. 8 is a block diagram illustrating one use of multiple suppression apparatus.

The embodiment of FIG. 7 is similar to those which have been described above, in that two collectors 10 and 12, which are spaced apart at least 1/10 wave length at the lowest frequency to be received, are connected together through a resistive system including potentiometer 124 and resistors 68, 70, 100 and 102. Resistor 70 is connected to a resistive network including resistors 264 and 266 to ground, and similarly resistor 102 is connected through resistors 268 and 270 to ground. As already described above, potentiometer 124 has a movable wiper 272 which produces an amplitude balance between the incoming signals. It is preferred that the signal amplitudes be balanced preceding the phase adjustment in the sequence of operations as an aid in setting up. However, the phase adjusting components may precede the amplitude adjusting components if desired.

Connected between the terminals of resistors 70 and 102 are phase inductors 274 and 276 and phase adjusting potentiometer 278. It will be understood that inductors or capacitors may be used as phase shifting elements in any of the described embodiments. The wiper 280 of potentiometer 278 is also grounded minimizing stray capacitance effects, drift and the like. Inductor 274 and the left-hand portion of potentiometer 278 constitute an RL network capable of varying phase over a wide range. Similarly the right-hand side of potentiometer 278 and inductor 276 serve the same function. By taking a voltage signal between point 282 and point 284, a signal varying in phase but of relatively constant amplitude will be sensed for variations in the position of wiper 280. Similarly in the right-hand side of the network the voltage between points 286 and 288 is relatively constant for all positions of wiper 280 although the voltage sensed therebetween will vary in phase depending upon the location of the wiper. Any slight variations in amplitude are cancelled by readjustment of potentiometer 124.

The primary winding 290 of a transformer 292 is connected between the points 282 and 284 through a switch 294, and a similar primary winding 293 is connected between the right-hand points 286 and 288. The secondary winding 295 of transformer is connected between ground and a tuned network. The switch 294 is capable of reversing the polarity of the primary winding 290 of transformer 292. Primary winding 290 is wound on a toroidal ferrite core 297 and primary winding 293 is wound on a similar core 299. The secondary winding 295 is coupled to the two cores 297 and 299 whereby the system is equalized with respect to ground and any stray capacitive effects in the two networks are balanced. Wiper 280 provides substantial phase shaft in the order of ±90°, while phase reversing switch 294 provides 180° phase reversal between the signals in the two networks, thus providing complete phase versatility. The combined signal from transformer 292 is induced in secondary winding 295 and applied to one terminal of an inductance 298 which is in series with a reactor 300 and forms a tuned circuit. A second inductance 302 of different reactance is connected in parallel with inductance 298 through a single pole single throw switch 304. Thus the circuit is adapted to tune to different bands of the frequency spectrum. For example, in one typical embodiment of the invention the circuit is tuned to the broadcast band from 500 to 1600 kc. when the switch 304 is closed. By opening switch 304 and thus increasing the inductive reactance of the tuned circuit, the device is more precisely tuned for the lower frequency portion of the spectrum between 160 kc. and 500 kc. The output across capacitor 300 is applied to a cathode follower including triode 306 through coupling capacitor 308, and the output of cathode follower 306 is taken at the cathode of triode 306 and applied to the subsequent utilization apparatus as indicated by arrow 307.

In FIG. 8 four collecting means 310, 312, 314 and 316 are shown in a system adapted to specifically eliminate two interference signals $I_1$ and $I_2$ from a desired signal S at the same frequency. The signal collector means 310 and 312 are connected to an interference suppression system 318 in the manner already described at length above with respect to collectors 10 and 12. The output of interference suppression system 318 is a signal including the desired signal S and a single interference signal $I_2$. Thus the suppression system 318 is designed to adjust the amplitude and phase of the two incoming signals from collectors 310 and 312, such that the adjusted phase relationship cancels the interference signal $I_1$. Similarly, an interference suppression system 320 of any one of the types described above receives signals from the two collectors 314 and 316 which are geographically spaced in a manner the same as or different from the spacing of collectors 310 and 312. The suppression system 320 is adapted to cancel the interference signal $I_1$ in a manner identical to that described with respect to system 318. The output of the two interference suppressors 318 and 320 may be identical, or they may differ in the phase relationship of the various signals or in relative amplitudes thereof. However, each of the two signals will include the desired signal S and an interference signal $I_2$.

The modified signals are applied through conductors 322 and 324 to a noise suppression system 326 which may be identical to the systems 318 and 320, or may be any one of the systems described above. In suppression system 326 the two incoming signals from conductors 322 and 324 are first balanced in amplitude in the event that there are amplitude differences and are then adjusted in phase so that the two adjusted incoming signals have equal amplitude interference signals $I_2$ of opposing phase whereby the interference signal $I_2$ is eliminated. Thus at the output of system 326 a signal is applied through conductor 328 to a receiver 330 or any other utilization device, and this signal includes only the desired signal S and specifically excludes the two rejected interference signals $I_1$ and $I_2$. The combined system of FIG. 8 is perhaps the simplest compound configuration employing four signal collectors 310, 312, 314 and 316 with three suppression systems 318, 320 and 326 to cancel two interference signals. However, other compound systems will immediately appear to one skilled in the art. For example, the antennas 312 and 314 may be combined into a single antenna if a multicoupler 313 is employed to apply similar but isolated signals from antenna 315 to the inputs of suppression systems 318 and 320. Thus, three antennas and three suppression systems are sufficient to eliminate two interference signals. By adding still another stack of four suppressors associated with a total of eight antennas, three interference signals $I_1$ $I_2$ and $I_3$ may be eliminated. The four suppressors would in turn feed the two illustrated suppressors 318 and 320 whereby three interference signals can be eliminated or three directions of signal propagation can be isolated from the desired direction of signal propagation.

Again, by employing a multicoupler, a single antenna can be employed to feed each of the four suppressors whereby a total of only five antennas are required for the suppression of three interference signals. Thus it will be apparent that through the employment of a multicoupler, the minimum number of separate antennas are required. This system can be employed to sharpen directivity instead of nulling specific interferences. By employing one or more suppression systems, a typical figure of eight or cardioid antenna pattern can be substantially elongated.

Figure 9:
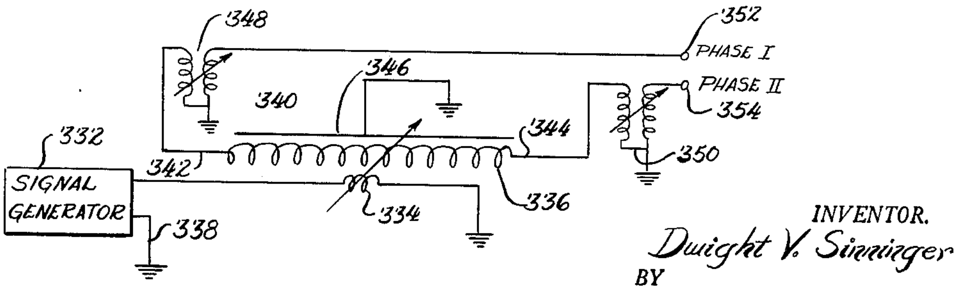
FIG. 9 illustrates the use of the instant invention as a multiple phase signal generator.

FIG. 9 illustrates still another embodiment of the instant invention in which the direction of signal propagation is reversed to generate two signals having a known phase relationship adjustable over 360° of relative phase angle. A signal generator 332 capable of generating a signal variable in frequency over a desired range is connected to the sensing or input winding 334 of an adjustable delay line 336. The signal generator is grounded through conductor 338. The delay line 336 may be identical to either the linear delay line 18, shown in FIG. 1, or the toroidal delay line 52, shown in FIG. 2. By moving the sensing coil 334 along the length of the delay line coil 340, the signal is impressed upon the delay line at any desired point along its geometric length. The signal, by well-known principles, is then propagated in both directions toward the terminals 342 and 344. Depending upon the precise location of the sensing coil 334, the signals will arrive at the terminals 342 and 344 in a predetermined and preselected phase relationship. Grounded conductor 346 functions as already described with respect to FIG. 1. The signal at delay line terminal 342 is applied to the primary of a coupling transformer 348, and the signal at the right-hand terminal delay line 340 is applied to a similar transformer 350. If desired, transformers 348 and 450 may be variable transformers whereby the amplitude of the output signals at terminals 352 and 354 may be adjusted in amplitude as well as in phase.

In addition to the signal generator shown in FIG. 9, each of the other embodiments of this invention, as illustrated in FIGS. 1–7, can be employed as signal generator systems by applying the signal generator 332 to the output of each of the embodiments. In that event two phase variable outputs are available at each pair of of collectors 10 and 12 in each of those embodiments.

While many embodiments of the invention have been described above, it will be apparent from the description and from the drawings that still further variations are possible within the clear spirit and scope of the instant invention. It is possible through various techniques to collect a plurality of signals at spaced collector means which are at least one-tenth of a wavelength apart whereby a desired signal may be selected based upon space directivity from one or more interference signals at precisely the same frequency or at a frequency so close to the desired signal that normal selection by tuned circuits is impossible. The described systems provide optimum selection of a desired signal by equalizing the amplitudes of two signals collected from spaced antennas and adjusting the phase of each of the two signals in a balanced manner to produce output signals of equal amplitude and such a phase relationship that the selected interference signal is completely eliminated and the desired signal is amplified.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An interference suppression system comprising first signal collector means providing an input signal which may include a desired signal and interference signals emanating from spaced sources, second signal collector means spaced from said first collector means and providing a second input signal which may include said desired signal and said interference signals, attenuator means associated with said first signal collector means and with said second signal collector means whereby said input signals may be altered in amplitude and rendered substantially equal, a delay line in the form of an elongate coil with input terminals at opposite ends connected to said attenuators for energization with attenuated input signals corresponding to said input signal and said second input signal, sensing means comprising a relatively short sensing coil mounted for longitudinal movement along the axis of said delay line and magnetically coupled thereto, said sensing means being coupled to said delay line and adapted to sense the combined signal at a given point along said line, means moving said sensing means along said line, and utilization means connected to said sensing means for energization with said combined signal, said combined signal including said attenuated input signals in adjusted phase relationship, the phase relationship being determined by the particular portion of said delay line being sensed by said sensing means.

2. The interference suppression system of claim 1 wherein the means for moving the sensing means is a conductive line substantially parallel to the axis of said delay line and mounted for longitudinal movement, portions of said conductive line comprising respective terminal connections for said sensing coil, said circuit including contactor means at opposite ends of said delay line in engagement with said conductive line to apply said combined signal to said utilization means.

3. The interference suppression system of claim 1 wherein said delay line is in the form of an arcuate coil with input terminals at opposite ends thereof, and said sensing means is a relatively short sensing coil mounted for arcuate movement in magnetically coupled relationship with an incremental portion of said delay line.

4. The interference suppression system of claim 1 wherein said delay line is in the form of an elongate coil with input terminals at each end, a hollow nonmagnetic core formed of spaced longitudinal conductive segments on which said coil is wound, and insulating material electrically isolating said coil from said core, said sensing means being inductively coupled to said delay line.

5. The interference suppression system of claim 1 including a tuned circuit and a cathode follower circuit, the output of said sensing means being applied to said tuned circuit and said cathode follower, said sensing means being inductively coupled to said delay line.

References Cited by the Examiner

UNITED STATES PATENTS

| | | | |
|---|---|---|---|
| 1,723,391 | 8/1929 | Weinberger | 325—371 |
| 1,758,940 | 5/1930 | Gage | 325—476 X |
| 1,872,487 | 8/1932 | Miller | 325—371 |
| 2,192,275 | 3/1940 | Royer | 325—475 X |
| 2,226,836 | 12/1940 | Sinninger | 325—371 |
| 2,271,909 | 2/1942 | Beverage | 325—475 X |
| 2,450,818 | 10/1948 | Vermillion | 325—476 |
| 2,452,586 | 11/1948 | Wirkler | 331—45 |
| 2,619,537 | 11/1952 | Kihn | 331—31 |
| 2,666,851 | 1/1954 | Carniol | 331—45 |
| 2,761,062 | 8/1956 | Wirkler | 325—476 |
| 2,884,520 | 4/1959 | Lambert | 325—475 |
| 3,081,439 | 3/1963 | Bennett | 333—31 |
| 3,092,793 | 6/1963 | Augustine et al. | 333—31 |

FOREIGN PATENTS

| | | | |
|---|---|---|---|
| 458,801 | 12/1936 | Great Britain. | |

DAVID G. REDINBAUGH, *Primary Examiner.*

J. W. CALDWELL, *Assistant Examiner.*